United States Patent

Keuper et al.

Patent Number: 6,085,133
Date of Patent: Jul. 4, 2000

[54] METHOD AND APPARATUS FOR CORRECTING VEHICLE CHASSIS SENSOR SIGNALS AND FOR CONTROLLING A VEHICLE CHASSIS

[75] Inventors: Gerhard Keuper, Leonberg; Karl-Heinz Senger, Loechgau; Roland Stoller, Fellbach, all of Germany

[73] Assignee: Robert Bosch GmbH, Stuttgart, Germany

[21] Appl. No.: 08/077,419

[22] Filed: Jun. 15, 1993

[30] Foreign Application Priority Data

Aug. 26, 1992 [DE] Germany ............... 42 28 414

[51] Int. Cl.[7] .................................................. B60G 17/00
[52] U.S. Cl. .................. 701/37; 701/38; 280/5.515; 280/124.108; 703/8
[58] Field of Search ................... 364/453, 434, 364/463, 424.05, 424.01; 280/707, 5.515, 124.108, 124.101, 5.519, 5.501, 5.507; 701/38, 45, 37; 703/8

[56] References Cited

U.S. PATENT DOCUMENTS

| | | | |
|---|---|---|---|
| 4,712,807 | 12/1987 | Kurosawa | 364/424.05 |
| 4,827,416 | 5/1989 | Kawagoe et al. | 364/424.05 |
| 4,873,655 | 10/1989 | Kondraske | 364/571.02 |
| 5,001,636 | 3/1991 | Shiraishi et al. | 364/424.05 |
| 5,001,647 | 3/1991 | Rapiejko et al. | 364/453 |
| 5,021,987 | 6/1991 | Chan et al. | 364/453 |
| 5,033,770 | 7/1991 | Kamimura et al. | 364/424.05 |
| 5,042,833 | 8/1991 | Kawabata | 364/424.05 |
| 5,058,017 | 10/1991 | Adachi et al. | 364/424.05 |
| 5,071,157 | 12/1991 | Majeed | 364/424.05 |
| 5,085,458 | 2/1992 | Kii et al. | 364/424.05 |

*Primary Examiner*—Kevin J. Teska
*Assistant Examiner*—Thai Phan
*Attorney, Agent, or Firm*—Baker & Daniels

[57] ABSTRACT

The invention provides first signals ($w_z$, $a_L$, $a_Q$, $a_{V1}$, $a_{V2}$, $a_{V3}$) representing the vehicle movements relative to an inertial reference system ($K_I$) for use in a chassis regulation and/or control system in a vehicle. Based on the first signals, correction values ($beta_S$, $beta_S'$, $beta_S''$, $alpha_S$, $alpha_S''$, $psi_S'$, $psi_S''$) for correction of the first signals are determined in such a way that vehicle movements relative to a road surface-fixed reference system ($K_S$) are inferred from corrected first signals ($S_{cor,i}$). The invention has the advantage that the inertial sensor signals disturbed by road surface inclinations are projected into the road surface plane, obtaining signals which represent the vehicle movement relative to the road surface.

7 Claims, 3 Drawing Sheets

METHOD AND APPARATUS FOR CORRECTING VEHICLE CHASSIS SENSOR SIGNALS AND FOR CONTROLLING A VEHICLE CHASSIS

BACKGROUND OF THE INVENTION

1. Field of the Invention

The invention relates to a method and apparatus for processing sensor signals used for control/regulation of a vehicle chassis.

2. Description of the Related Art

To improve the travel comfort of passenger cars and/or trucks, the configuration of the chassis is of considerable significance. With the passive chassis which presently continue to be used predominantly, the suspension systems between the vehicle body and the wheels are at the time of installation configured either tendentially hard ("sporty") or tendentially soft ("comfortable"), depending on the predicted use of the vehicle. An influencing of the chassis characteristic during the travel operation is not possible with these systems.

With active chassis, in contrast, the characteristic of the suspension systems can be influenced during the travel operation in the sense of a control or regulation, depending on the existing state of travel.

For control or regulation of such an active chassis, the suspension systems are actuated for application of forces between the wheels and the body depending on the current state of travel of the vehicle. For that purpose it is essential to capture the momentarily existing state of travel of the vehicle as exactly as possible.

To capture the state of travel, movements which are typical for the road performance of the vehicle are generally sensed. These movements are for instance longitudinal and transverse movements of the vehicle, vertical body movements of the vehicle and yaw movements. Depending on chassis regulation or control strategy, these sensor signals are then processed to actuation signals for the actuators of the chassis regulating system. For that purpose, most varied regulation and/or control strategies derive from the prior art, which for instance differ in that a minimization of the vehicle body movements (high comfort) or a minimization of the wheel load fluctuations (high road safety) is desired.

Essential for these strategies is that the obtained sensor signals represent the movements of the vehicle on the road surface in a maximally unadulterated manner.

SUMMARY OF THE INVENTION

For the processing of sensor signals for use in a chassis regulation and/or control system in an automobile, first signals ($w_z$, $a_L$, $a_Q$, $a_{V1}$, $a_{V2}$, $a_{V3}$) inventionally captured which represent the vehicle movements relative to an inertial reference system ($K_I$) Basing on the first signals, correction values ($beta_S$, $beta_S'$, $beta_S''$, $alpha_S$, $alpha_S''$, $psi_S'$, $psi_S''$) for correction of first signals are then determined in such a manner that vehicle movements relative to a road surface-fixed reference system ($K_S$) are inferred from the corrected first signals ($S_{cor}i$).

Since the inertially measuring motion sensors known from the prior art capture generally the vehicle movements relating to an inertial reference system, the processing of these signals in the framework of a chassis regulation and/or control system can entail adulterations whenever the vehicle is being moved on an inclined road surface. Owing to the road surface inclination, these sensors always measure also the acceleration components caused by gravitation.

The invention has the advantage that it effects a projection of the inertial sensor signals disturbed by the road surface inclinations, into the road surface plane. The result are signals which represent the vehicle movement relative to the road surface and/or by which the gravitational shares of the measured signals can be corrected. Since for activation of the actuators of the chassis regulation and/or control system there are of interest also the vehicle movements relative to a road surface-fixed reference system, the procedure according to the invention enables an improvement of the entire chassis regulation and/or control system. These improvements have relevance especially for vehicle movement data which in the framework of the chassis regulation and/or control strategy are integrated with respect to time. In such integrations, the shares attributable to the aforementioned components of gravitational acceleration will add up and can thus result in deteriorations of the overall system. For the purpose of this application, where any form of the term "control" is used, such as "control", "controller", or "controlling", it is to be understood that such term includes the meaning of the term "regulation", i.e., such "control" may or may not include a feedback loop.

According to the invention, a direct determination of the road surface inclinations (longitudinal and/or transverse road surface inclination) and their derivations from the available inertially measured sensor signals and a known relative movement of the vehicle to the road surface is possible. Moreover, the inventional system is suited to process the disturbed sensor signals in real time, that is, without delays.

One embodiment of the invention includes a method and apparatus for capturing, as first signals representing the vehicle movements relative to an inertial reference system, sensor signals $a_L$ which represent the longitudinal acceleration of the vehicle in the inertial reference system, and/or by capturing sensor signals $a_Q$ which represent the transverse acceleration of the vehicle in the inertial reference system, and/or sensor signals $a_{V1}$, $a_{V2}$ and $a_{V3}$ representing the vertical accelerations of the vehicle, especially of the vehicle body, in the inertial reference system, and/or signals $w_Z$ representing the yaw velocity of the vehicle in the inertial reference system.

Moreover, the signals $w_Z$ representing the yaw velocity of the vehicle in the inertial reference system can be differentiated, thereby obtaining the decisive share of the yaw acceleration of the vehicle in the inertial reference system.

Favorable is also, for correction of the inertial first signals, to capture the relative movements between the vehicle body and the wheels and/or the longitudinal and/or transverse movement of the vehicle.

Furthermore, the corrected first signals, respectively the vehicle movements in the road surface-fixed reference system determined thereof, can be utilized for control and/or regulation of the chassis. The variables for correction represent for instance the longitudinal and/or transverse inclination of the road surface and its time-based variations and/or the pivot of the road surface-fixed reference system ($K_S$) about the inertial vertical axis and its time variation. The vehicle movements in the road surface-fixed reference system determined thereof may for instance be heave, pitch and roll movements of the vehicle body and their time variations.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
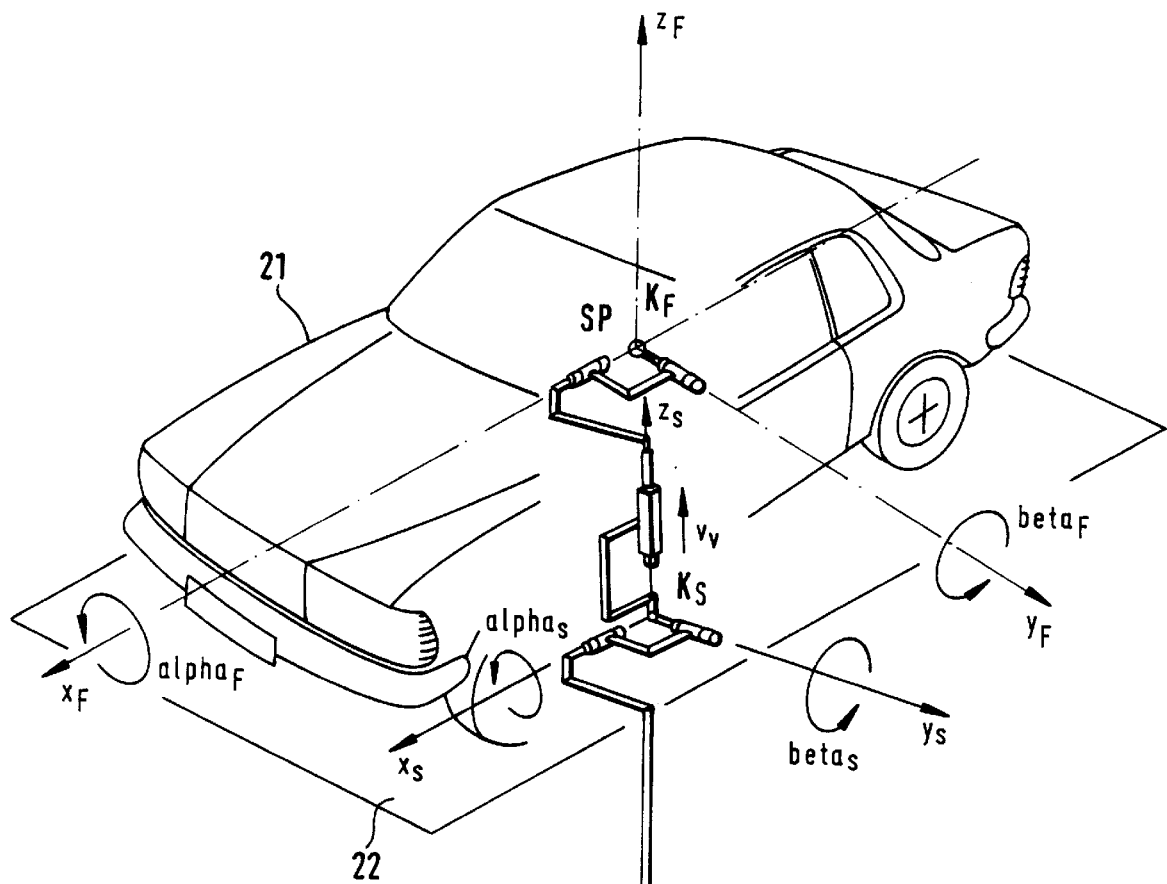
FIG. 2 illustrates variables used in the present invention.

Before illustrating the invention in detail with the aid of an embodiment, the following will first address the physical background. FIG. 2 shows the sketch of a vehicle 21 contained on a level slab 22 corresponding to the road surface. The vehicle-fixed and the road surface-fixed reference system are indicated by the vehicle-fixed coordinate system $K_F$ and the road surface-fixed coordinate system $K_S$, respectively, while the inertial system is represented by the inertial coordinate system $K_I$. The movements of the road surface traveled by the vehicle (road surface inclinations) relative to the inertial system and the movements of the vehicle relative to the inertial system are indicated in FIG. 2 by linkage joints of the coordinate systems $K_I$, $K_S$, and $K_F$.

The axes (x, y, z) of the Cartesian coordinate systems $K_I$, $K_S$ and $K_F$ are provided with the proper indices (I, S, F). The pitch and roll movements of the vehicle relative to the road surface are signified by $beta_F$ and $alpha_F$ in the vehicle-fixed reference system $K_F$, and the absolute longitudinal inclination and transverse inclination of the road surface by $beta_S$ and $alpha_S$, respectively.

An objective of the inventional method is to determine with an existing sensor system of a vehicle the momentary longitudinal and transverse inclination of the road surface as well as their time derivations from the current sensor signals.

The generally nonlinear kinematic equations for description of the movement of the sensors (acceleration sensors, yaw velocity sensors), and thus the sensor signals, are established dependent on the variables sought, and in order to linearize the variables sought. The linearized relations are equated with the sensor signals measured. Corresponding to the number $n_S$ of the sensors used, $n_S$ equations are obtained for $n_S$ variables. It is necessary to make sure that the $n_S$ sensor signals are mutually independent signals and, therefore, also $n_S$ mutually independent equations are concerned.

Acceleration sensors secured to the vehicle body, for instance sensors for the longitudinal, transverse and vertical acceleration and yaw velocity sensors, provide inertial measuring signals, that is, signals which depend on their absolute state of motion. The kinematic description of the signals is generally effected through the movement of a vehicle-fixed coordinate system $K_F$ relative to the inertial system $K_I$. The dependence of the signals on the road surface longitudinal and transverse accelerations sought as well as their derivations are allowed for by introduction of another coordinate system, the road surface system $K_S$. Moving along with the vehicle, the road surface system $K_S$ is so selected that the $x_S$ and $y_S$ axes are situated in the road surface plane and that the center of gravity of the vehicle body is located always on the $z_S$ axis.

The absolute movement of the body and thus also of individual points of the body, for instance sensors, follows thus from two composite partial movements, the movement of the road surface system $K_S$ relative to the inertial system $K_I$ and the movement of the body system $K_F$ relative to the road surface system $K_S$.

The angles $beta_F$ and $alpha_F$ describe the pitch and roll angle, respectively, of the vehicle body to the road surface and the angles $beta_S$ respectively $alpha_S$ the absolute inclination of the road surface in the longitudinal and transverse direction relative to the vehicle body. The translatory variables $r_{Z,F}$, $V_{Z,F}$ and $a_{Z,F}$ indicate the vertical movement of the body center of gravity perpendicularly to the road surface.

The translatory movement of the road surface system $K_S$ is clearly illustrated as a function of the road surface inclination as well as the vehicle longitudinal and transverse movement relative to the road surface:

$$^{I}V_S = {^{I}V_S}(V_L, V_Q, beta_S, alpha_S) \quad (1)$$

$$^{I}a_S = {^{I}a_S}(V_L, V_L', V_Q, V_Q', beta_S, beta_S', alpha_S, alpha_S') \quad (2)$$

Here, the prime symbol suffixed to a variable means that this variable has been time-derived once (differentiated). For instance, beta' means the first time derivation of the variable beta, i.e., $beta_S'$ means the first time derivation of the road surface longitudinal inclination beta. If two prime symbols are suffixed to a variable, this means that the variable has been time-derived twice.

The absolute acceleration of any point P of the vehicle body as well as the absolute angular velocity and acceleration of the vehicle body are thus obtained as generally nonlinear functions:

$$a_P = a_P(V_L, V_L', V_Q, V_Q', r_{Z,F}, V_{Z,F}, a_{Z,F}, beta_F, \quad (3)$$
$$beta_F', beta_F'', alpha_F, alpha_F', alpha_F'', psi_S', psi_S'',$$
$$beta_S, beta_S', beta'', alpha_S, alpha_S', alpha_S'')$$

$$w_F = w_F(beta_F, beta_F', alpha_F, \quad (4)$$
$$alpha_F', psi_S', beta_S, beta_S', alpha_S, alpha_S')$$

$$w_F' = w_F'(beta_F, beta_F', beta_F'', alpha_F, alpha_F', alpha_F'', psi_S', \quad (5)$$
$$psi_S'', beta_S, beta_S', beta_S'', alpha_S, alpha_S', alpha_S'')$$

The kinematic relations of the individual sensors are obtained with the appropriate distances of the sensors from the center of gravity of the body:

longitudinal acceleration: $a_L = a_P(1) = a_{p,x}$
transverse acceleration: $a_Q = a_P(2) = a_{p,y}$
vertical acceleration: $a_V = a_P(3) = a_{p,z}$
yaw velocity: $w_Z = w_F(3) = w_{F,z}$, where the numbers 1, 2, 3 indicate the components of the vectors $a_p$ and $w_z$.

The relative variables of the vehicle body to the road surface $r_{Z,F}$, $V_{Z,F}$, $a_{Z,F}$, $beta_F$, $beta_F'$, $beta_F''$, $alpha_F$, $alpha_F'$, $alpha_F''$ are determined by measuring the spring deflection paths Zarij and their derivations Zarij' and the vehicle longitudinal motion $V_L$, $V_L'$, for instance by measuring the wheel speeds and by their derivation. These variables, thus, are to be assumed as sufficiently known.

Unknown, in addition to the road surface inclinations sought and their derivations $$\beta_S, \beta_S', \beta_S'', \alpha_S, \alpha_S', \alpha_S''$$

and of the pivot of the road surface system $K_S$ about the inertial vertical axis $$\psi_S', \psi_S''$$

are the vehicle transverse acceleration and its derivation $$V_Q, V_Q'.$$

While the vehicle transverse velocity $V_Q$ provides only a negligibly small share of the acceleration signals, and thus also can be set at zero, its derivation $V_Q'$ for the kinematic presentation of the sensor signals, specifically of the transverse acceleration signal, must be allowed for. This is possible by direct measurement of the vehicle transverse velocity (for instance by optical measuring procedures) and subsequent differentiation:

Derivation of the vehicle transverse velocity (d/dt) $(V_Q)$ $\rightarrow V_Q'$.

For determining the eight variables sought $$\beta_S, \beta_S', \beta_S'', \alpha_S, \alpha_S', \alpha_S'', \psi_S', \psi_S''$$

there are eight mutually independent equations required, and thus eight mutually independent sensor signals.

In the embodiment of the invention proposed here, the following inertially measuring sensor system of the vehicle is assumed:

| | |
|---|---|
| one yaw velocity sensor | $\rightarrow w_Z$ |
| one longitudinal acceleration sensor | $\rightarrow a_L$ |
| one transverse acceleration sensor | $\rightarrow a_Q$ |
| three vertical acceleration sensors | $\rightarrow a_{V1}, a_{V2}, a_{V3}.$ |

A further signal can be obtained by differentiation of the measured yaw velocity $w_Z$:

derivation of the yaw velocity (d/dt) $(w_Z) \rightarrow w_Z'$.

Any further acceleration sensor would cause a linear dependency of the sensor signals. Therefore, one of the variables sought must be neglected and set at zero. Simulations have shown that the terms depending on the angular velocities $\beta_S'$ and $\alpha_S'$ contribute nearly nothing to the acceleration. signals. In this configuration, the road surface transverse inclination angle velocity $\alpha_S'$ is set to zero. Hence, there are $n_S=7$ nonlinear equations obtained for determination of $$\beta_S, \beta_S', \beta_S'', \alpha_S, \alpha_S'', \psi_S', \psi_S''$$

where:

$$\alpha_S'=0.$$

Obtained upon linearization of the $n_S$ equations by the variables sought, by equating the measured sensor signals and the established kinematic equations for the sensors, is a 7th order linear equation system:

$$\begin{pmatrix} w_z \\ w_z' \\ a_{v1} \\ a_{v2} \\ a_{v3} \\ a_L \\ a_Q \end{pmatrix} = A * \begin{pmatrix} \psi_S' \\ \psi_S'' \\ \beta_S \\ \beta_S' \\ \beta_S'' \\ \alpha_S \\ \alpha_S'' \end{pmatrix}$$

with a [7×7]-coefficient matrix:

$$A=A(V_L, V_L', V_Q, V_Q', r_{Z,F}, V_{Z,F}, a_{Z,F}, \beta_F, \beta_F', \beta_F'', \alpha_F, \alpha_F', \alpha_F'').$$

Using formula manipulation programs, the linear equation system can be established outside the vehicle (off-line) in symbolic form and solved. In the vehicle (on-line), only the actual values of the coefficient matrix A are then to be determined yet. This avoids a time-expensive numeric solution of the linear equation system and enables real-time processing.

Figure 1:
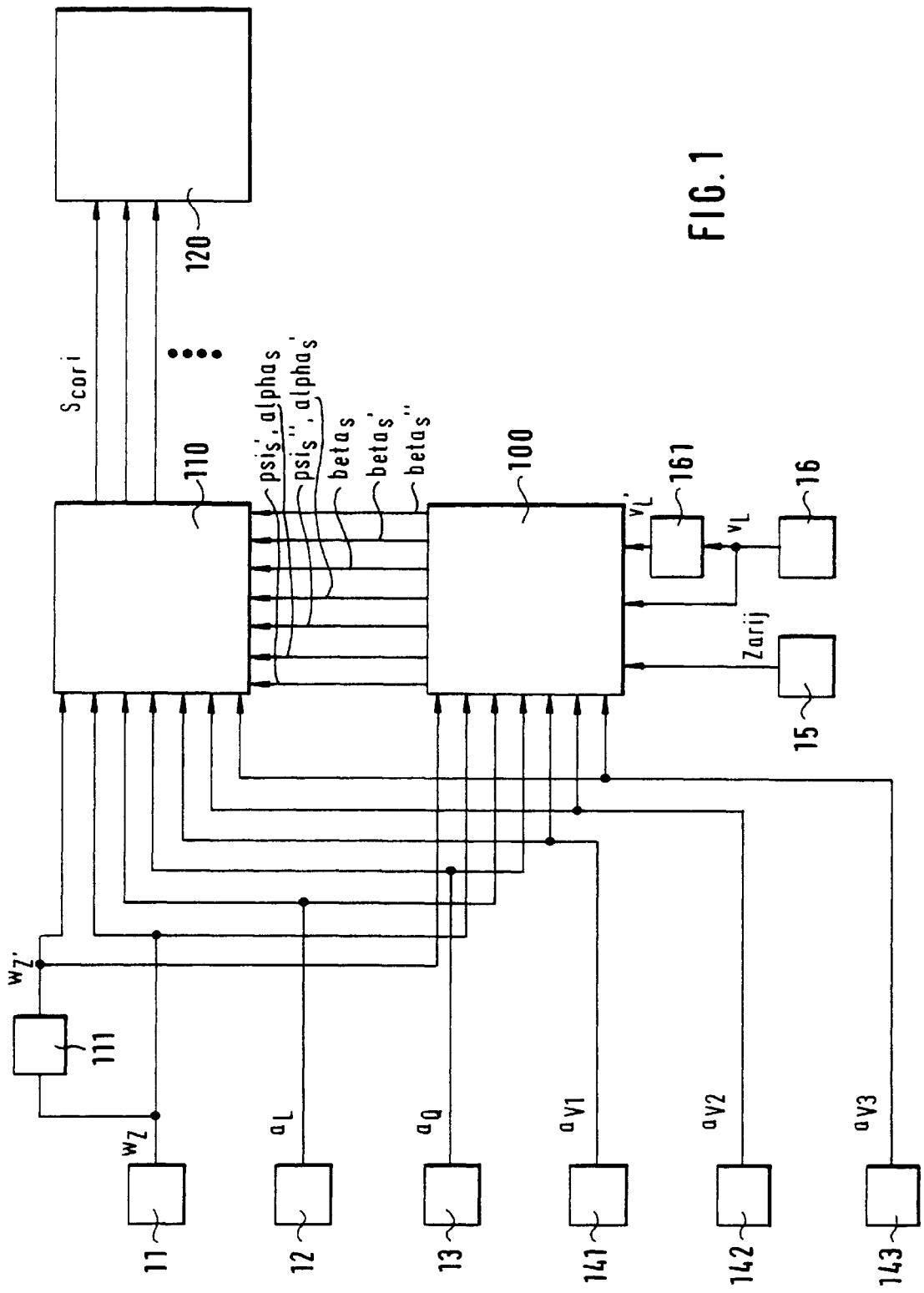
FIG. 1 illustrates a block diagram of an embodiment of the present invention.

FIG. 1 illustrates a block diagram of the embodiment of the invention. As already mentioned, the sensors 11, 12, 13, 141, 142 and 143 provide sensor signals ($w_Z$, $a_L$, $a_Q$, $a_{V1}$, $a_{V2}$, $a_{V3}$) representing the yaw velocity, longitudinal acceleration, transverse acceleration and the vertical body accelerations of the vehicle. The sensors 11, 12, 13, 141, 142 and 143 provide absolute (inertial) variables of motion. The signal $w_Z$ of the yaw velocity can be differentiated in the units 111 to the yaw acceleration $w_Z'$. The sensor signals are then transmitted to the units 100. Found in the units 100, as described above, are now the signals $\beta_S$, $\beta_S'$, $\beta_S''$, $\alpha_S$, $\alpha_S''$, $\psi_S'$, $\psi_S''$, which represent the road surface longitudinal and transverse inclination and their time variations and the pivot of the road surface-fixed reference system ($K_S$) about the inertial vertical axis and its time variation.

The signals of the sensors 11, 12, 13, 141, 142, 143 (the signals disturbed by the road surface inclinations) representing the inertial vehicle movements are now corrected (corrected signals $S_{cor}i$) in the correction units 110 in such a way that they represent the movements of the vehicle in the road surface system. The signals corrected in this manner are then utilized for the chassis regulation/control in controller 120.

For correction of the inertial signals, as described above, the spring deflection movements Zarij of the spring deflection movement sensors 15 and the vehicle longitudinal velocity, respectively the vehicle longitudinal acceleration, for instance from the wheel speed sensors 16, respectively the differentiating unit 161, are transmitted to the units 100. Prevailing on the outputs of the units 100 are then the signals $\beta_S$, $\beta_S'$, $\beta_S''$, $\alpha_S$, $\alpha_S''$, $\psi_S'$, $\psi_S''$ representing the road surface longitudinal and transverse inclination and their time variations and the pivot of the road surface-fixed reference system ($K_S$) about the inertial vertical axis and its time variation.

By a strategy not described in detail, these signals are processed further, in controller 120, to activation signals of the appropriate actuators.

Correction units 110 and controller 120, of course, can also be configured as one unit. This is suitable particularly when the sensor signals are not directly corrected, but only the inertial vehicle movements determined by the chassis regulation respectively control strategy from the sensors signals. Determined this way, for instance for suppression of the vehicle body movements from the vertical body acceleration signals $a_{V1}$, $a_{V2}$ and $a_{V3}$ and the transverse and longitudinal acceleration signals $a_Q$ and $a_L$, can be the inertial heave, pitch and roll movements of the body. These inertial heave, pitch and roll movements of the body can then be corrected by the road surface longitudinal and transverse inclination to the heave, pitch and roll movements of the body in the road surface-fixed system.

Figure 3:
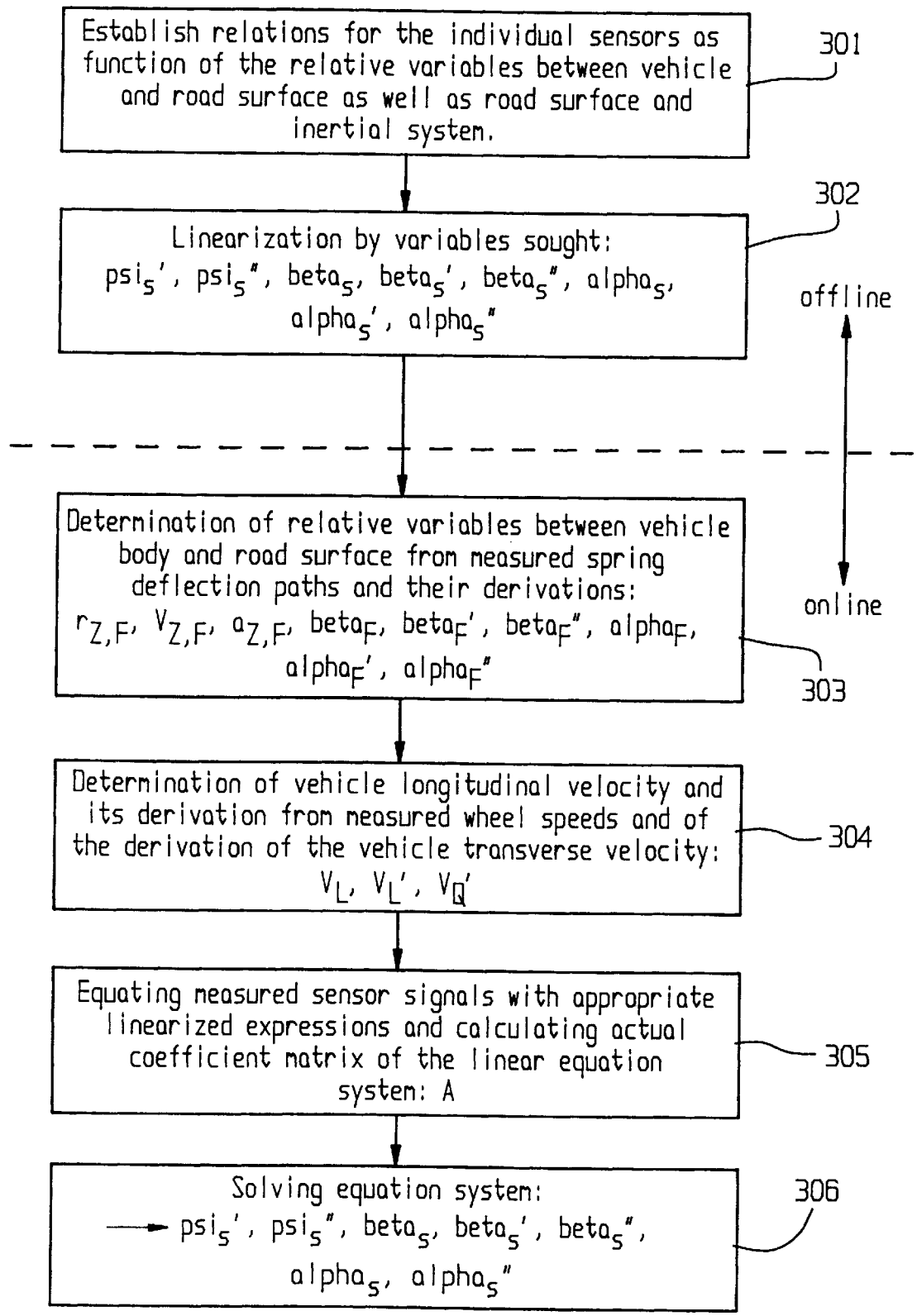
FIG. 3 illustrates a flow chart associated with the embodiment of FIG. 1.

FIG. 3 illustrates the sequence of the inventional method in the form of a flow chart.

In a first step 301, the relations for the individual sensors are established as a function of the relative variables between vehicle and road surface as well as between road surface and inertial system. In a second step 302, the linearization is carried out by the variables sought:

$$beta_S, beta_S', beta_S'', alpha_S, alpha_S'', psi_S', psi_S''$$

where $$alpha_S' = 0.$$

The steps 301 and 302, as mentioned before, are established in symbolic form and solved outside the vehicle (off-line). During travel, i.e., in the vehicle (on-line), the relative variables between the vehicle body and the road surface are determined in step 303 from the measured spring deflection paths and their derivations. In the fourth step 304, the vehicle longitudinal velocity and its derivation are determined, for instance from the measured wheel speeds and the derivation of the vehicle transverse velocity.

In a fifth step 305, the measured sensor signals are equated with the appropriate linearized expressions, and the actual coefficient matrix A of the linear equation system is calculated. In a last step 306, the equation system is now solved, thus obtaining the sought variables $$beta_S, beta_S', beta_S'', alpha_S, alpha_S'', psi_S', psi_S''$$

where:

$$alpha_S' = 0.$$

An effective and undisturbed state of travel observation is thus obtained for vehicles with a chassis regulation respectively control, in that a projection of the inertial sensor signals disturbed by road surface inclinations is effected, into the road surface plane. According to the invention, the direct determination of the road surface inclinations and their derivations is possible from available inertial sensor signals, whereby the undisturbed sensor signals can be determined in real time, since the solutions of the pertaining equations are shown in analytical presentation.

In addition to the configuration for determination of the longitudinal and transverse inclination as well as the yaw movement of the road surface as illustrated in the above embodiment, further configurations are possible at reduced sensor expense:

1. Determination of the longitudinal inclination and yaw movement of the road surface with

- one yaw velocity sensor → $W_Z$
- one longitudinal acceleration sensor → $a_L$
- two vertical acceleration sensors capturing the vertical acceleration of the vehicle body in the rear and front body regions
  → $a_{V,front}$, → $a_{V,rear}$.

2. Determination of the longitudinal inclination of the road surface with one longitudinal acceleration sensor → $a_L$ two vertical acceleration sensors capturing the vertical acceleration of the vehicle body in its rear and front regions → $a_{V,front}$, → $a_{V,rear}$.

The calculation schematic described above remains the same, except that the variables of no interest are set to zero and the linear equation system is reduced in accordance with the variables sought.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling a chassis of a vehicle, said vehicle including a chassis, a body, and a plurality of wheels, said method comprising the steps of:

sensing a plurality of first signals representing movements of the vehicle relative to an inertial reference system;

determining correction values for correcting said first signals, said correction values being dependent on a plurality of second signals which represent one of relative movements between a said body and a said plurality of wheels, longitudinal movements of a said vehicle, and transverse movements of a said vehicle;

providing corrected first signals dependent on said correction values;

determining movements of the vehicle relative to a road surface-fixed reference system dependent on said corrected first signals; and controlling the chassis dependent on said determined movements.

2. The method of claim 1, wherein said first signals comprise a plurality of signals representing at least one of:

a yaw velocity of the vehicle relative to said inertial reference system;

a longitudinal acceleration of the vehicle relative to said inertial reference system;

a transverse acceleration of the vehicle relative to said inertial reference system; and a vertical acceleration of the vehicle relative to said inertial reference system.

3. The method of claim 1, wherein said correction values further represent at least one of a road surface longitudinal inclination, road surface transverse inclination, time dependent variations of said road surface longitudinal inclination, time dependent variations of said road surface transverse inclination, a pivotal orientation of said road surface-fixed reference system about a vertical axis of said inertial reference system, and time dependent variations of said pivotal orientation of said road surface-fixed reference system about said vertical axis of said inertial reference system.

4. The method of claim 3, wherein said first signals comprise a plurality of signals representing at least one of:

a yaw velocity of the vehicle relative to said inertial reference system;

a longitudinal acceleration of the vehicle relative to said inertial reference system;

a transverse acceleration of the vehicle relative to said inertial reference system; and a vertical acceleration of the vehicle relative to said inertial reference system.

5. The method of claim 4, comprising the further step of differentiating said first sensor signals representing said yaw velocity.

6. The method of claim 1, wherein said corrected first signals comprise a plurality of signals representing at least one of:

a yaw velocity of the vehicle relative to said inertial reference system;

a longitudinal acceleration of the vehicle relative to said inertial reference system;

a transverse acceleration of the vehicle relative to said inertial reference system; and a vertical acceleration of the vehicle relative to said inertial reference system.

7. A system for controlling a chassis of a vehicle, said vehicle including a chassis, a body, and a plurality of wheels, said system comprising:

a plurality of sensors providing first signals representing movements of the vehicle relative to an inertial reference system;

means for correcting said first signals dependent on at least one correction value, said at least one correction value being dependent on a plurality of second signals which represent one of relative movements between a said body and a said plurality of wheels, longitudinal movements of a said vehicle, and transverse movements of a said vehicle; and means for determining movements of a said vehicle relative to a road surface-fixed reference system dependent on said corrected first signals; and means for controlling said chassis, dependent on said determined movements.

* * * * *